(12) United States Patent
Oswald et al.

(10) Patent No.: US 6,395,853 B1
(45) Date of Patent: May 28, 2002

(54) WATER-SOLUBLE COPOLYMERS AND THEIR USE FOR EXPLORATION AND PRODUCTION OF PETROLEUM AND NATURAL GAS

(75) Inventors: Reinhard J. Oswald, Vienna (AT); Roman Morschhäuser, Mainz (DE); Karl Heinz Heier, Frankfurt am Main (DE); Aranka Tardi, Neuberg (DE); Juergen Tonhauser, Oestrich-Winkel (DE); Christoph Kayser, Mainz (DE); Dan Patterson, Huntersville, NC (US)

(73) Assignee: Clariant GmbH, Frankfurt (DE)

( * ) Notice: Subject to any disclaimer, the term of this patent is extended or adjusted under 35 U.S.C. 154(b) by 86 days.

(21) Appl. No.: 09/590,525

(22) Filed: Jun. 8, 2000

(30) Foreign Application Priority Data

Jun. 10, 1999 (DE) .......................... 199 26 355

(51) Int. Cl.$^7$ ............................. C08F 226/02
(52) U.S. Cl. ................ 526/307.2; 526/274; 526/287; 526/303.1
(58) Field of Search .................. 526/240, 274, 526/287, 303.1, 307.2, 31

(56) References Cited

U.S. PATENT DOCUMENTS

| | | |
|---|---|---|
| 3,465,825 A | 9/1969 | Hook et al. |
| 3,629,101 A | 12/1971 | Hille et al. |
| 3,943,996 A | 3/1976 | Guilbault et al. |
| 3,994,852 A | 11/1976 | Adams et al. |
| 4,035,323 A | 7/1977 | Mathis |
| 4,048,077 A | 9/1977 | Engelhardt et al. |
| 4,095,561 A | 6/1978 | Chauveteau et al. |
| 4,309,523 A | 1/1982 | Engelhardt et al. |
| 4,340,525 A | 7/1982 | Hubner et al. |
| 4,413,681 A | 11/1983 | McKenzie |
| 4,568,471 A | 2/1986 | Defosse |
| 4,587,283 A | 5/1986 | Hille et al. |
| 4,602,685 A | 7/1986 | McKenzie et al. |
| 4,683,953 A | 8/1987 | Eustace et al. |
| 4,718,491 A | 1/1988 | Kholer et al. |
| 4,742,094 A | 5/1988 | Brothers et al. |
| 4,842,071 A | 6/1989 | Zaitoun et al. |
| 5,032,295 A | 7/1991 | Matz et al. |
| 5,379,841 A | 1/1995 | Pusch et al. |
| 6,277,900 B1 * | 8/2001 | Oswald et al. ............ 523/130 |

FOREIGN PATENT DOCUMENTS

| | | |
|---|---|---|
| DE | 28 30 528 | 1/1980 |
| EP | 0 116 671 | 8/1984 |
| EP | 0 118 332 | 9/1984 |
| EP | 0 192 447 | 8/1986 |
| EP | 1033378 * | 9/2000 |
| GB | 1 473 767 | 5/1977 |

* cited by examiner

Primary Examiner—Helen L. Pezzuto
(74) Attorney, Agent, or Firm—Richard P. Silverman

(57) ABSTRACT

The invention relates to copolymers comprising a) 5–95% by weight of structural units which are derived from compounds of the formula 1

$$H_2C=CH-C(=O)-HN-C(CH_3)-CH_2-SO_3^{\ominus}X^{\oplus} \quad (1)$$

Figure 1:
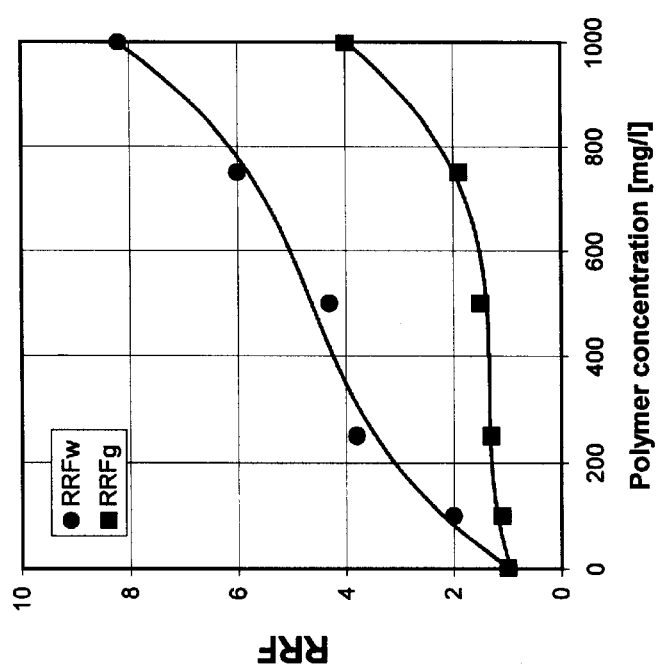

b) from 1 to 95% by weight of structural units which are derived from compounds of the formula 2

$$H_2C=CH-PO_3^{2-} \quad (2\,X^+) \quad (2)$$

and c1) from 1 to 95% by weight of structural units which are derived from compounds of the formula 3

$$(H_2C=CH-CH_2)_2 N^{\oplus}(CH_3)_2 \; Cl^- \quad (3)$$

or, alternatively, to c1), c2) from 1 to 95% by weight of structural units which are derived from compounds of the formula 4

$$H_2C=CH-C(=O)-HN-(CH_2)_3-\overset{\oplus}{N}(CH_3)_3\;Cl^- \quad (4)$$

n which X is a cation. The copolymers according to the invention are suitable as a fluid loss additive for water-based drilling muds and for cement slurries in deep wells, for completion and clearing-out liquids and for water shut-off in production probes.

3 Claims, 2 Drawing Sheets

Example 11 / Vosges sandstone

Example 11 / Oberkirchner sandstone

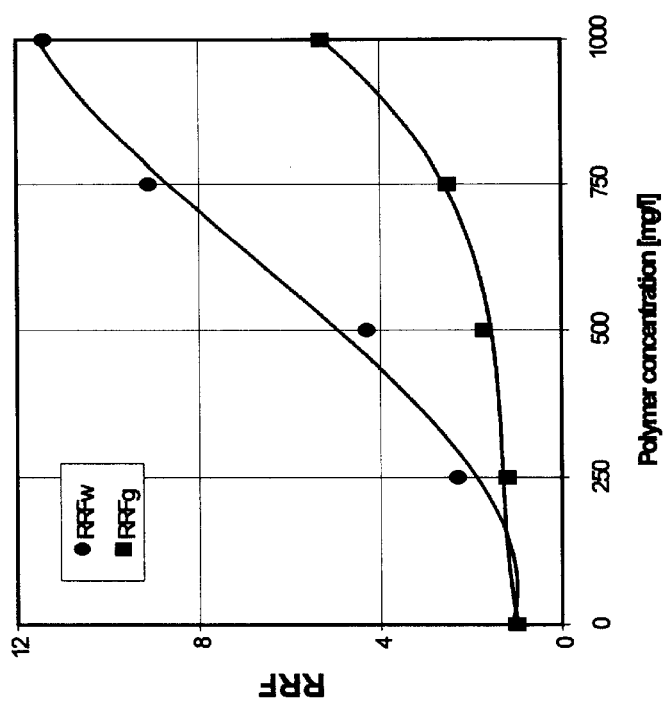
Fig. 4 / Comparative Example 15
Oberkirchner sandstone
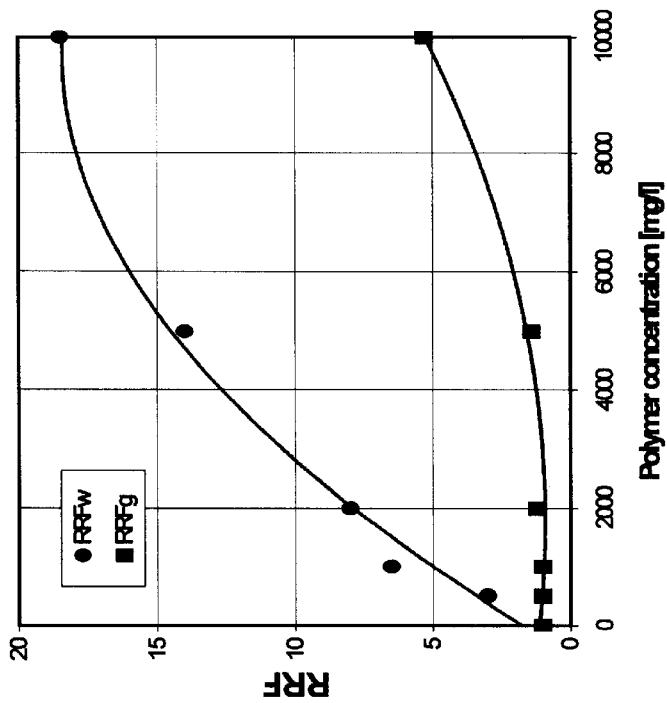
Fig. 3 / Comparative Example 15
Vosges sandstone

WATER-SOLUBLE COPOLYMERS AND THEIR USE FOR EXPLORATION AND PRODUCTION OF PETROLEUM AND NATURAL GAS

BACKGROUND OF THE INVENTION

The present invention relates to water-soluble copolymers comprising structural units derived from acrylamido-N-methylenepropenylsulfonates (AMPS), vinylphosphonic acid and vinylphosphonic salts (VPS) and cationic allyl or vinyl compounds, such as diallyidimethylammonium chloride (DADMAC), and their use as additives in deep wells, cemented deep wells and completion and clearing-out liquids and for reducing the permeability of the water in the area close to the probe of petroleum or natural gas and water-conveying horizons.

In the area of deep-drilling technology, polymers perform various tasks in water-based drilling muds. Thus, they lead to a reduction of water loss especially when drilling through permeable formations by establishing a thin filter layer which seals the drill hole. In addition, they keep the resulting drillings in suspension by dispersion and thus help, inter alia, to transport the drillings above ground. Moreover, by using polymeric additives, the rheological properties of the drilling muds are changed; in particular, there is an increase in the viscosity and yield point. Especially fluid-loss additives for deep wells should have high thermal stability and little susceptibility to problems under highly saline conditions, in particular with respect to polyvalent cations and should at the same time influence the rheological properties as little as possible since otherwise, when low water loss values are established, there is an undesired increase in the plastic viscosity and yield point.

After a certain section has been drilled, the casing is introduced into the borehole. The casing must then be fixed, i.e. a cement slurry which hardens with high strengths must be pumped into the annular space between the casing and the formation. The hardened cement must be impermeable to gases and liquids so that no gas and/or oil can flow out of the carrier formation into other formations or to the surface. The cement slurry to be pumped must meet very high requirements. It should be readily pumpable, i.e. of the lowest possible viscosity, and nevertheless not separate out. The release of water to the porous formation should be low so that the pumping pressure does not increase excessively as a result of constriction of the annular space by relatively thick filter cakes on the borehole wall, which may lead to disintegration of the formation. If the cement slurry releases too much water, it does not set completely and is permeable to gas and oil. Finally, the resulting cement jacket in the annular space must reach a certain strength as rapidly as possible and shrinkage must not occur during setting, as this would lead to flow channels for gas, oil and water.

An optimal formulation of the cement slurry properties is possible only by means of additives.

A distinction is made between 3 major groups of additives:

1. Retardants which increase the setting time so that the cement slurry remains sufficiently fluid for the entire pumping phase, which lasts for several hours in the case of very deep wells. The most well-known products of this type are lignosulfonates and carboxymethylhydroxyethylcelluloses.
2. Dispersants which homogeneously disperse the cement slurries and reduce the viscosity, which leads to better pumping thereof. As such products, U.S. Pat. No. 3,465,825 describes condensates of mononaphthalenesulfonates and formaldehyde and U.S. Pat. No. 4,053,323 describes N-sulfoalkyl-substituted acrylamides. The lignosulfonates and carboxymethylhydroxyethylcellulose ethers, too, have a dispersing effect on cement slurries in addition to the retarding effect.
3. Water-loss reducers which reduce the release of water by the cement slurries to porous formations during the pumping of the cement slurries into the annular space between casing and borehole wall. The most well-known products of this type are fully synthetic acrylate/acrylamide copolymers according to DE-B-28 30 528 and block copolymers of vinylpyrrolidone and acrylamide according to GB-B-14 73 767 and the semisynthetic carboxymethylhydroxyethyl- and hydroxyethylcellulose ethers.

The water-loss reducers are of particular importance since pumpable cement slurries which consist only of cement and water release large volumes of water when they flow past porous rock layers during cementing of the borehole. The alkaline water causes clays in the formations to swell and, with $CO_2$ from the natural gas or petroleum, forms precipitates of calcium carbonate. Both effects reduce the permeability of the deposits and decrease the subsequent production rates. The cement optimally formulated above ground for the respective cementing undergoes, as a result of the water release, a viscosity increase which is difficult to calculate and makes pumping more difficult. The release of water to porous formations can lead to an inhomogeneous cement material which does not solidify homogeneously and is permeable to gases, to liquid hydrocarbons and to waters. This can result in the escape of natural gas or petroleum through the annular space filled with porous cement into other formations and, in extreme cases, above ground. Furthermore, aggressive saline waters and gases can act on the casing through the porous cement and corrode said casing.

To ensure a technically satisfactory cementing of boreholes, it is necessary to reduce the water loss of the cement slurries used. The water loss is measured comparatively using a filter press according to API Code 29. The filter area is 45.8±0.7 $cm^2$, the superatmospheric pressure is 7±0.7 atm gauge pressure and the filtration time is 30 minutes. Recently, measurements of the water loss have been carried out more and more frequently by means of a high-temperature and high-pressure filter press (Baroid No. 387). Usually, filtration is carried out with a differential pressure of 35 bar, and the temperature is matched to that occurring in practice.

The semisynthetic cellulose ethers of the hydroxyethylcellulose type and partially also carboxymethylhydroxyethylcellulose ethers have been widely used to date for reducing the water loss of cement slurries. Their practical use is limited by the temperatures to which the cement slurries are exposed. The effect declines sharply above 100° C. and can then no longer be compensated by using larger amounts. Fully synthetic copolymers comprising acrylamide and acrylic acid or vinylpyrrolidone have not become established in deeper wells with higher floor temperatures. Particularly when saline waters are used for formulating the cement slurries, said copolymers have a very moderate effect which decreases further at higher temperatures. Saline waters are customary in offshore wells and are necessary when cementing salt layers. These products fail completely if $CaCl_2$ is used as a setting accelerator. The prior art shows that there is at present a gap in the case of products for reducing the water loss of cement slurries for deep wells, particularly if the cement slurries are exposed to temperatures above 100° C. and are formulated with saline waters.

In some cases, the additives have more than one function. Dispersants, such as lignosulfonates and polymethylenenaphthalenesulfonates, retard setting and slightly reduce water loss. Some water-loss reducers retard setting and dramatically increase viscosity.

The first highly effective water-loss reducers, which are still used today, are hydroxyethyl- and carboxymethylhydroxyethylcellulose. Hydroxyethylcellulose increases viscosity and slightly retards setting. Carboxymethylhydroxyethylcellulose has a greater retardant effect, but this can be compensated by accelerators. The effect declines markedly with increasing temperature. Consequently, many different fully synthetic polymers having higher thermal stability have been proposed and are used.

U.S. Pat. No. 3,994,852 describes, for example, polyvinylpyrrolidone polyacrylamide polymers, U.S. Pat. No. 3,943,996 methacrylamidopropenyltrimethylammonium chloride copolymers, U.S. Pat. No. 4,015,991 hydrolyzed acrylamide-acrylamidomethylenepropenylsulfonate copolymers, U.S. Pat. No. 4,340,525 acrylamide, sodium acrylate and sodium vinylsulfonate terpolymers, U.S. Pat. No. 4,413,681 reaction products of polyamine and high molecular weight sulfonated polymers, U.S. Pat. No. 4,602,685 dimethyldiallylammonium chloride-acrylic acid copolymers, EP-A-0 192 447 dimethylacrylamide-acrylamidomethylene-propenylsulfonate copolymers, U.S. Pat. No. 4,683,953 methacrylamidopropylene-trimethylammonium chloride, styrene sulfonate and acrylamide terpolymers, U.S. Pat. No. 4,742,094 reaction products comprising polyethyleneimine and sulfonated organic compounds, EP-A-0 118 332 hydrolyzed terpolymers of the vinyl sulfonate-acrylamide-vinylamide type and EP-A-0 116 671 acrylamidomethylene-propenylsulfonate, acrylamide (partially hydrolyzed) and vinylamide terpolymers, which are used in cement slurries for controlling the water loss.

The large number of compounds developed clearly shows that there are always problems in formulating an optimum cement slurry. In the case of individual parameters predetermined by the type of cementing, the other properties have to be adjusted to acceptable values by means of additives. The large numbers of compounds developed for reducing the water loss shows how problematic it generally is to establish a required water release without substantially increasing the viscosity, to establish the setting time according to requirements and to minimize the sedimentation. Water-loss reducing polymers increase to a greater or lesser extent the viscosity of the cement slurries, which generally have a high density.

For good pumpability of the cement slurries, the viscosity must be kept low. A pumping rate which permits turbulent flow should be possible. Only under these conditions is the drilling mud completely displaced. This is essential for good cementing. In the case of slanting wells, the drilling mud can be thoroughly displaced only by a strong turbulent flow.

In addition to the use as auxiliaries for formulating the cement slurries, water-soluble copolymers are also used in the so-called water shut-offs. This is the reduction of the water permeability in the area close to the probe of petroleum or natural gas and water-conveying horizons. The use of water-shutoff polymers therefore reduces or shuts off water flows to a production well.

Often, water exists as salt solution in the same formation as petroleum or natural gas. The recovery of petroleum or of natural gas thus entails the recovery of water in an amount such that it gives rise to considerable problems. It directly or indirectly causes deposition of salts in the vicinity of the well or in the well itself, it considerably increases the corrosion of all metal parts below ground or above ground, it increases, without benefits, the amounts of pumped, transferred and stored liquids and, together with the oil, it forms emulsions which are difficult to break above ground and which form blockages below ground in the cavities of the formation.

A large number of processes proposed and practised according to the prior art are intended to reduce the water flows into the wells for recovery of petroleum or natural gas. They often comprise introducing an impenetrable barrier in the formation between the water and the well or between the water and the petroleum or natural gas. The compositions usually introduced also block almost as much petroleum or natural gas as water. The components of this barrier may be: cement, resins, suspensions of solid particles, paraffins or water-soluble polymers which are crosslinked by introducing so-called crosslinkers in the deposit.

Polymers often used are those which are introduced in solution into the porous medium, are adsorbed onto the surface of the solid and penetrate into the pore space and are therefore suitable for reducing the inflow of water by friction. In contrast, the nonaqueous fluids, such as petroleum or especially natural gas, pass the adsorbed macromolecules which now occupy a negligible volume on the wall and thus leave the passage completely free.

U.S. Pat. No. 4,095,651 discloses the use of hydrolyzed polyacrylamides. However, it has been found that this type of polymer is effective mainly with respect to water having a low salt content and is degraded by water having a higher salt content. At relatively high temperatures and in the presence of polyvalent ions, these polymers tend to form precipitates which may block the pores of the rock formation.

U.S. Pat. No. 4,718,491 discloses the use of polysaccharides. These compounds, which are poorly injectable into the pore space, do retard or reduce the water inflow but permit only incomplete extraction of the deposits present or lose their activity at higher temperatures.

U.S. Pat. No. 4,842,071 discloses the use of unhydrolyzed acrylamide polymers or copolymers which are hydrolyzed by subsequent introduction of a water-based solution. This process has disadvantages with regard to an additional effort for introducing a further solution, and due to the problem of the accessibility of the injected polymer solution owing to the subsequent application of the base solution and with respect to increased susceptibility of the equipment used to corrosion. In addition, the polymer solution becomes effective only on reaction with the water-based solution, the degree of effectiveness being determined by the degree of reaction.

BACKGROUND OF THE INVENTION

The object of the invention is to provide substances which can be used both in exploration, i.e. in drilling mud and cementing, and in production wells. They should therefore be effective water-loss reducers and be suitable for water shut-offs.

It has now surprisingly been found that copolymers comprising structural units of acrylamido-N-methylenepropenylsulfonates, vinylphosphonic acid or salts thereof and a cationic comonomer permit the formulation of cement slurries having low water loss. These additives also have outstanding properties as drilling mud. In addition, they are capable of selectively reducing the water permeability in natural gas- or petroleum- and water-conveying horizons to such an extent that they are suitable for water shut-off.

DESCRIPTION OF THE PREFERRED EMBODIMENTS

The invention relates to copolymers comprising

A) 5–95% by weight of structural units which are derived from compounds of the formula 1

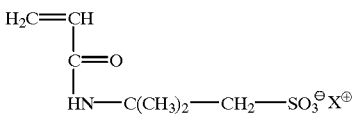
(1)

B) from 1 to 95% by weight of structural units which are derived from compounds of the formula 2

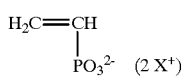
(2)

and

C1) from 1 to 95% by weight of structural units which are derived from compounds of the formula 3

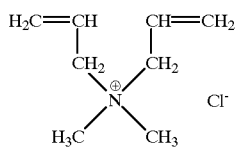
(3)

or, alternatively to C1),

C2) from 1 to 95% by weight of structural units which are derived from compounds of the formula 4

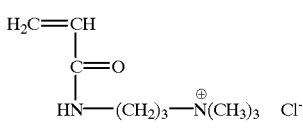
(4)

in which X is a cation.

Suitable cations X are monovalent and divalent metal cations, such as, for example, $Na^+$, $K^+$, $Mg^{2+}$, $Ca^{2+}$ or $NH_4^+$.

The copolymers according to the invention comprise structural units A, B and C1 or C2. In a preferred embodiment of the invention, the copolymers additionally contain from 2 to 95% by weight, in particular from 5 to 20, especially from 5 to 15,% by weight of structural units derived from compounds of the formula (5)

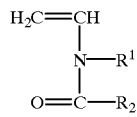
(5)

Here, $R^1$ and $R^2$, independently of one another, are hydrogen or $C_1$–$C_4$-alkyl, $R^1$ and $R^2$ together may also form a ring. If $R^1$ and $R^2$ form a ring, $R^1$ and $R^2$ together are —$(CH_2)_n$—, in which n is 3, 4 or 5. In particularly preferred embodiments, compounds of the formula (5), in which $R^1$ and $R^2$ are H, $R^1$ and $R^2$ are $CH_3$, $R^1$ is $CH_3$ and $R^2$ is H or $R^1$ and $R^2$ form a ring, where n is 3 or 4.

In a further preferred embodiment of the invention, the copolymers comprise from 1 to 80% by weight, in particular from 10 to 60% by weight, of structural units which are derived from acrylamide or from acrylic acid. Mixtures of the two structural units may also be present, in which case the quantity limits are applicable to the sum of these structural units.

In a further preferred embodiment, the proportion of structural units derived from compounds of the formula I in the copolymer is from 40 to 90, in particular from 45 to 80,% by weight. The proportion of structural units derived from compounds of the formula 2 is preferably from 1 to 40, in particular from 1 to 10,% by weight. The proportion of structural units derived from compounds of the formula 3 is preferably from 1 to 50, in particular from 1 to 30,% by weight.

The monomer units may be in any sequence in the copolymers. They may be either random polymers or block polymers.

The molecular weights (number average) of the copolymers according to the invention are preferably from 50,000 to 3,000,000; in particular, products from 200,000 to 1,000,000 are used.

The relative viscosity and the k value serve as indicator for the molecular weight. To determine the k value, the copolymer is dissolved in a certain concentration (generally 0.5%) and the efflux time at 25° C. is determined by means of an Ubbelohde capillary viscometer. This value gives the absolute viscosity of the solution ($\eta_c$). The absolute viscosity of the solvent is $\eta_0$. The ratio of the two absolute viscosities gives the relative viscosity $$z = \frac{\eta_c}{\eta_0}$$

From the relative viscosities, the k value can be determined as a function of the concentration by means of the following equation:

$$\mathrm{Lg}\, z = \left(\frac{75 \cdot k^2}{1 + 1.5kc} + k\right)c$$

The copolymers according to the invention can be prepared by copolymerization of compounds of the formulae 1, 2 and 3 or 4 and, if required, 5, acrylic acid or acrylamide in the stated ratios.

The copolymers according to the invention can be prepared by the conventional polymerization methods, such as solution polymerization, mass polymerization, emulsion polymerization, inverse emulsion polymerization, precipitation polymerization or gel polymerization.

The polymerization is preferably carried out as solution polymerization in water and as precipitation polymerization.

On carrying out the copolymerization in a water-miscible organic solvent, the conditions of precipitation polymerization are employed. Here, the copolymer is obtained directly in solid form and can be isolated by distilling off the solvent or filtering with suction and drying.

Water-miscible organic solvents which are suitable here are in particular water-soluble alkanols, i.e. those having 1 to 4 carbon atoms, such as methanol, ethanol, propanol, isopropanol, n-butanol, sec-butanol and isobutanol, but preferably tert-butanol.

The water content of the lower alkanols used here as solvent should not exceed 6% by weight, since otherwise agglomeration may occur during the polymerization. Preferably, a water content of 0–3% by weight is employed.

The amount of the solvent to be used depends to a certain degree on the type of comonomers used.

As a rule, from 200 to 1000 g of the solvent are used per 100 g of total monomers.

When carrying out the polymerization in an inverse emulsion, the aqueous monomer solution is emulsified in a known manner in a water-immiscible organic solvent, such as cyclohexane, toluene, xylene, heptane or high-boiling gasoline fractions, with the addition of from 0.5 to 8% by weight, preferably from 1 to 4% by weight, of known emulsifiers of the w/o type and polymerized with conventional free radical initiators. In this process, water-soluble monomers or mixtures thereof are polymerized at elevated temperatures to give high molecular weight copolymers by first emulsifying the monomers or the aqueous solutions thereof, with the addition of water-in-oil emulsifiers, in water-immiscible organic solvent forming the continuous phase, and heating this emulsion in the presence of free radical initiators. The comonomers to be used may be emulsified as such in the water-immiscible organic solvent or they may be used in the form of an aqueous solution which contains from 100 to 5% by weight of comonomers and from 0 to 95% by weight of water, the composition of the aqueous solution depending on the solubility of the comonomers in water and on the intended polymerization temperature. The ratio of water to the monomer phase can be varied within wide limits and is as a rule from 70:30 to 30:70.

To emulsify the monomer phase in the water-immiscible organic solvent to give a water-in-oil emulsion, from 0.1 to 10% by weight, based on the oil phase, of a water-in-oil emulsifier are added to the mixtures. Preferably used emulsifiers are those which have a relatively low HLB value. The oil phase used can in principle be any inert water-insoluble liquid, i.e. in principle any hydrophobic organic solvent. In general, hydrocarbons whose boiling point is in the range from 120 to 350° C. are used. These hydrocarbons may be saturated, linear or branched paraffin hydrocarbons, as are predominantly present in petroleum fractions, it also being possible for these to comprise the usual proportions of naphthene hydrocarbons. However, aromatic hydrocarbons, such as, for example, toluene or xylene, and mixtures of the abovementioned hydrocarbons may also be used as the oil phase. A mixture of saturated normal paraffin and isoparaffin hydrocarbon which comprises up to 20% by weight of naphthenes is preferably used.

Copolymers having a particularly high degree of polymerization in the base chains are obtained as polymerization is carried out in aqueous solution by the so-called gel polymerization method. From 15 to 60% strength aqueous solutions of the comonomers are used with known suitable catalysts without mechanical mixing, with utilization of the Trommsdorff-Norrisch effect.

By subsequently heating the polymer gels, obtained in the gel polymerization, in the temperature range from 50 to 130° C., preferably from 70 to 100° C., the quality properties of the polymers can be further improved.

The copolymers prepared by this method and present in the form of aqueous gels can be dissolved directly in water after mechanical comminution using suitable apparatuses and can be used. However, they can also be obtained in solid form after removal of the water by known drying processes and not dissolved again in water until they are used.

The polymerization reaction is carried out in the temperature range from −60° C. to 200° C., preferably from 10 to 120° C., it being possible to employ either atmospheric pressure or superatmospheric pressure. As a rule, the polymerization is carried out in an inert gas atmosphere, preferably under nitrogen.

High-energy electromagnetic or corpuscular radiation or conventional chemical polymerization initiators can be used for initiating the polymerization, for example organic peroxides, such as benzyl peroxide, tert-butyl hydroperoxide, methyl ethyl ketone peroxide or cumyl hydroperoxide, azo compounds, such as azobisisobutyronitrile or 2'-azobis(2-amidopropane) dihydrochloride, and inorganic peroxy compounds, such as $(NH_4)_2S_2O_8$ or $K_2S_2O_8$ or $H_2O_2$, if required in combination with reducing agents, such as sodium bisulfite and iron(II) sulfate, or redox systems which comprise an aliphatic or aromatic sulfinic acid, such as benzenesulfinic acid or toluenesulfinic acid or derivatives of these acids, such as, for example, Mannich adducts or sulfinic acid, aldehydes and amino compounds, as a reducing component. As a rule, from 0.03 to 2 g of the polymerization initiator are used per 100 g of total monomers.

It is furthermore known that small amounts of so-called moderators may be added to the polymerization batches, said moderators harmonizing the course of the reaction by flattening the reaction rate/time diagram. They thus lead to an improvement in the reproducibility of the reaction and therefore make it possible to prepare uniform products having extremely small quality deviations. Examples of suitable moderators of this type are nitrilotrispropionylamide or monoalkylamines, dialkylamines or trialkylamines, such as, for example dibutylamine. Such moderators can advantageously also be used in the preparation of the copolymers according to the invention.

Furthermore, so-called regulators, i.e. those compounds which influence the molecular weight of the polymers prepared, can be added to the polymerization batches. Known regulators which may be used are, for example, alcohols, such as methanol, ethanol, propanol, isopropanol, n-butanol, sec-butanol and amyl alcohols, alkyl mercaptans, such as, for example, dodecyl mercaptan and tert-dodecyl mercaptan, isooctyl thioglycolate and some halogen compounds, such as, for example, carbon tetrachloride, chloroform and methylene chloride.

The copolymers according to the invention are outstandingly suitable as auxiliaries in drilling muds. They have a very good protective colloid effect both at high temperatures and at high electrolyte concentrations and correspond at least to the prior art with respect to electrolyte stability and aging stability. They are considerably superior to the copolymers disclosed to date in U.S. Pat. Nos. 3,629,101, 4,048,077 and 4,309,523 with regard to the pressurized water-reducing effect and in the rheological behavior after mixing and after aging over the entire temperature range from 130 to more than 200° C.

For formulating aqueous drilling muds, the copolymers according to the invention are preferably used in concentrations from 0.5 to 40 kg/m$^3$, in particular from 3 to 30 kg/m$^3$. The aqueous drilling muds furthermore contain bentonite for increasing the viscosity and sealing drilled formations. For increasing the density of the drilling muds, barite, chalk and iron oxides are added.

Bentonite, barite, chalk and iron oxide can be added to the drilling muds alone or in a very wide range of mixing ratios, it being necessary to retain the rheological properties of the drilling muds.

If the copolymers according to the invention are added to conventional deep-well cement slurries which preferably comprise 30–65% by weight, in particular 35–55% by weight, based on the dry cement used, of water, cement slurries having considerably improved flow and setting properties and having low water loss are obtained.

The polymers according to the invention are preferably added in amounts of 0.1–2.0% by weight, based on the cement used, to cement slurries of conventional composition which, based on, for example, "Class G" deep-well cement, contain, for example, 44% by weight of water, 0.1–2.0% by weight of commercial dispersant for deep-well cement and, if required, retardants or accelerators and other additives. Depending on requirements, the cement slurry can, for example, also be mixed with synthetic sea water or with NaCl solutions of different densities to saturation instead of with water.

The quality of the cement slurries thus prepared with the polymers according to the invention is assessed according to API spec 10. Cement slurries having advantageously low plastic viscosity, low water loss and setting time controllable according to the requirements are obtained in a temperature range of 60–200° C.

The copolymers according to the invention are furthermore preferably used for reducing or completely shutting off the water flow in wells in sandstone, carbonate rock or silicate rock. By modifying the copolymers used, the absorptivity of the polymer can be adapted to the type of rock present. By so-called anionic modification of the polymers used, the absorption of carbonate-containing rocks can be improved. Anionic modification is usually achieved by a proportion of structural units of the formula (1) and in particular of the formula (2) in polymers.

By so-called cationic modification of the polymers used, the absorption on silicate-containing rocks can be improved. Cationic modification is usually achieved by a proportion of structural units of the formulae (3) or (4).

The copolymers according to the invention contain both structural units of the formulae (1) and (2) and those of the formulae (3) or (4). They thus reduce the relative water permeability by improved adsorption onto carbonate-containing rock and onto silicate-containing rocks and onto the frequently occurring mixed forms.

For completion and clearing-out liquids, for example, $CaCl_2$ (max. 1.40 g/cm$^3$), $CaBr_2$-(max. 1.71 g/cm$^3$) or $CaCl_2/CaBr_2$ (max. 1.81 g/cm$^3$) solutions are used, it being necessary for said solution to have a low water loss at higher temperatures too.

EXAMPLES

The preparation and use of the polymers according to the invention are illustrated by the following examples.

Method 1

Precipitation Polymerization 600 ml of tert-butanol are initially introduced into a polymerization flask of 2 l capacity, equipped with stirrer, reflux condenser, dropping funnel, gas inlet tube and electrically heated waterbath, and 70 g of AMPS are suspended therein with stirring, after which 8.5 l of $NH_3$ gas are passed in and then 11 g of acrylamide, 15 g of N-vinylformamide, 3.33 g of 60% strength DADMAC and 3.1 g of 65% strength vinylphosphonic acid are added. With introduction of nitrogen, the reaction mixture is heated to 50° C. by means of the electrical waterbath, and 1.0 g of azoisobutyronitrile is added. After an induction time of about 2 hours, the polymerization begins, the reaction temperature increases to 70° C. and the polymer is precipitated. Heating is continued for a further 2 hours at 80° C., a viscous suspension forming. The polymer can be isolated by filtration with suction and drying under reduced pressure at 50° C. However, it is also possible to distill off the solvent from the reaction mixture directly under reduced pressure. The polymer is obtained in the form of a white light powder which dissolves readily in water.

Method 2

Polymerization in Aqueous Solution 121.4 ml of demineralized water and 1.6 g of 65% strength vinylphosphonic acid are initially introduced into a polymerization flask of 1 l capacity, equipped with stirrer, reflux condenser, dropping funnel, gas inlet tube and electrically heated waterbath and flushed with nitrogen, and aqueous 22% strength ammonia solution is added until a pH of 7–7.5 has been reached. The solution is then heated to 60° C.

A monomer/initiator solution comprising 209 g of demineralized water, 72.6 g of AMPS, 29.1 g of 50% strength acrylamide, 10.4 g of N-vinylformamide, 5.2 g of 60% strength DADMAC, 2.1 g of acrylic acid, 0.5 ml of isopropanol, 0.51 g of 2,2'-azobis(2-amidinopropane) dihydrochloride and the amount of aqueous 22% strength ammonia solution required for establishing a pH of 7.0–7.5 is prepared.

10% (about 45 ml) of the monomer/initiator solution are introduced into the polymerization flask. The mixture is stirred at 60° C. until the polymerization is initiated (about 30 minutes). The remaining monomer/initiator solution is then added at a constant metering rate over a period of 2.5 hours. Heating is continued for a further 2 hours at 80° C. A clear, highly viscous solution is obtained and can be used directly as a drilling mud additive or as an additive for cement slurries.

Method 3

Gel Polymerization 160 ml of demineralized water, 42 g of AMPS, 52 g of acrylamide, 3.15 g of 65% strength vinylphosphonic acid and 6.7 g of 60% strength DADMAC are initially introduced into a polymerization flask of 1 l capacity, equipped with stirrer, reflux condenser, gas inlet tube, thermocouple and pH meter with combined glass electrode, and a pH of 7.2 is established with 19.4 g of aqueous 22% strength ammonia solution. Cooling is effected to 20° C., the stirrer is removed and the atmospheric oxygen is expelled with nitrogen. Thereafter, 4 g of a 10% strength ammonia persulfate solution are added and, after 10 minutes, the gas inlet tube is removed and the nitrogen stream is stopped. The reaction starts immediately. After standing overnight, a highly viscous to stiff, clear gel is obtained.

Method 4

Inverse Emulsion Polymerization 179.5 g of ®Isopar M (mixture of branched $C_8$–$C_{14}$-paraffins, Esso) are initially introduced into a polymerization flask of 1 l capacity, equipped with stirrer, thermometer, dropping funnel, reflux condenser and gas inlet tube, and 13.3 g of nonylphenol/ethylene oxide adduct (®Arkopal N-100, Clariant GmbH) and 35.3 g of sorbitan monooleate (®Span 80, Atlas Chemie GmbH) are dissolved therein.

The monomer solution is prepared separately. 190 ml of water are initially introduced, 70 g of AMPS are dissolved therein and the pH is adjusted to 7.5–8.5 by passing in ammonia gas while cooling with ice. 5.3 g of 65% strength vinylphosphonic acid, 11.2 g of 60% strength DADMAC and 86.7 g of acrylamide are then added. The monomer solution is then mixed with the oil phase with stirring in the course of 5 minutes. The reaction mixture is then emulsified with the Ultraturrax while cooling with ice for 3 minutes. 2 ml of a 1% strength solution of cumyl hydroperoxide in ethyl acetate are added, the polymerization flask is then evacuated 3 times to less than 4 mbar, ventilation is effected in each case with nitrogen and thereafter nitrogen is passed in continuously. The monomer emulsion is cooled to 5° C. and a constant stirring speed of 180 rpm is maintained from now on. 100 ppm of thionyl chloride are then added, shortly after which the polymerization starts, evident from a temperature increase. The reaction temperature is kept at 18–20° C. by cooling. Once an exothermic reaction is no longer detectable, heating is effected to 50° C. and 10 g of a 1% strength by weight solution of ammonia persulfate in water is metered in in the course of 60 minutes and stirring is then continued for a further 5 hours at 50° C. After cooling to 20° C., 27.5 g of Arkopal N-100 are stirred in for better inversion. A stable microemulsion which can be directly used is thus obtained.

In Table 1 below, the copolymers according to the invention which are prepared by the methods described above and their preferred uses are summarized. The compositions are in percent by weight, unless stated otherwise.

In Table 1. the abbreviations having the following meanings:

AM: acrylamide
AMPS: 2-acrylamido-2-methylpropane-3-sulfonic acid
VPA: vinylphosphonic acid
VF: vinylformamide
NVP: N-vinylpyrrolidone
DADMAC: diallyldimethylammonium chloride
AMPT: 1-N-acrylamidopropyl-3-trimethylammonium chloride In the applications, the meanings are as follows:

DM: drilling mud
CW: completion and clearing-out liquids
WSO: water shut-off
C: deep-well cementing

TABLE 1

| | | Monomer composition | | | | | | | | | |
|---|---|---|---|---|---|---|---|---|---|---|---|
| No. | K value | AMPS | VPA | DADMAC | AMPT | VF | NVP | AM | Method | Use | Remark |
| 1 | 181 | 70 | 2 | 2 | 0 | 15 | 0 | 11 | 1 | DM, C | according to the invention |
| 2 | 190 | 70 | 2 | 0 | 2 | 15 | 0 | 11 | 2 | DM, C | according to the invention |
| 3 | 156 | 81 | 2 | 2 | 0 | 7.5 | 7.5 | 0 | 1 | DM | according to the invention |
| 4 | 208 | 70 | 1 | 3 | 0 | 10 | 2* | 14 | 2 | C | according to the invention |
| 5 | 205 | 70 | 1 | 0 | 3 | 10 | 2* | 14 | 2 | C | according to the invention |
| 6 | 202 | 80 | 1 | 3 | 0 | 10 | 2* | 4 | 2 | C | according to the invention |
| 7 | 158 | 80 | 2 | 2 | 0 | 16 | 0 | 0 | 1 | DM | according to the invention |
| 8 | 160 | 80 | 2 | 2 | 0 | 0 | 16 | 0 | 1 | DM | according to the invention |
| 9 | 205 | 74 | 4 | 22 | 0 | 0 | 0 | 0 | 2 | C, CW | according to the invention |
| 10 | 195 | 74 | 4 | 0 | 22 | 0 | 0 | 0 | 2 | C, CW | according to the invention |
| 11 | >250 | 42 | 2 | 4 | 0 | 0 | 0 | 52 | 3 | WSO | according to the invention |
| 12 | >250 | 42 | 2 | 0 | 4 | 0 | 0 | 52 | 3 | WSO | according to the invention |
| 13 | 230 | 42 | 2 | 4 | 0 | 0 | 0 | 52 | 4 | WSO, CW | according to the invention |
| 14 | 235 | 42 | 2 | 0 | 4 | 0 | 0 | 52 | 4 | WSO, CW | according to the invention |
| 15 | 226 | 46 | 2 | 0 | 0 | 0 | 0 | 52 | 3.4 | WSO | comparison |
| 16 | 178 | 65 | 0 | 0 | 0 | 20** | 0 | 15 | 1 | DM, C | comparison |
| 17 | 154 | 75 | 0 | 10 | 0 | 7.5 | 7.5 | 0 | 2 | DM | comparison |

*contains acrylic acid instead of NVP;
**contains N-vinyl-N-methylacetamide (VIMA) instead of VF In the examples below, copolymers according to the invention are compared with known copolymers in a sea water drilling mud densified with barite and comprising 3% of KCl and having a specific gravity of 2.1 kg/l. The amount used was 2.5% by weight in each case.

The quality of the drilling mud and hence the effectiveness of the additives are rated according to the following criteria:

a) Fluid loss after 30 minutes in an HTHP filter press at 150° C. and a pressure of 500 psi (~35 bar) after dynamic aging of the drilling mud for 16 hours and 66 hours in a roller oven at 130° C., 150° C., 170° C., 185° C. and 200° C.

b) Rheology (apparent viscosity [app. visc.], yield point [YP], gel strength after 10 seconds [10"] and 10 minutes [10']) measured in the Fann-35 rotational viscosimeter after mixing and after dynamic aging for 16 hours and 66 hours in the roller oven at 130° C., 150° C., 170° C., 185° C. and 200° C.

The following additives were used for the investigation:

A) copolymer (according to the invention) comprising 81% by weight of AMPS, 7.5% of N-vinylformamide, 7.5% of N-vinylpyrrolidone, 2% of vinylphosphonic acid and 2% of diallyidimethylammonium chloride according to Example 3

B) copolymer comprising 65% of AMPS, 20% of N-vinyl-N-methylacetamide and 15% of acrylamide (Comparative Example 16)

C) copolymer comprising 75% of AMPS, 7.5% of N-vinylformamide, 7.5% of N-vinylpyrrolidone and 10% of DADMAC (Comparative Example 17).

TABLE 2

| Co-polymer | Aging/h Temp. (° C.) | before | 16 130 | 16 150 | 16 170 | 66 170 | 16 200 |
|---|---|---|---|---|---|---|---|
| A | Fluid loss (ml) |  | 41 | 39 | 23 | 22 | 25 |
|   | App. visc. (cP) | 76 | 87 | 76 | 83 | 80 | 60 |
|   | YP (lb/100 ft 2) | 28 | 33 | 32 | 23 | 9 | 7 |
|   | 10" gel strength | 6 | 8 | 9 | 7 | 3.5 | 5 |
|   | 10' gel strength | 13 | 14 | 12 | 10 | 6 | 5 |
| B | Fluid loss (ml) |  | 37 | 20 | 16 | 37 | >150 |
|   | App. visc. (cP) | 134 | 106 | 108 | 76 | 45 | 35 |
|   | YP (lb/100 ft 2) | 66 | 46 | 31 | 11 | 11 | 12 |
|   | 10" gel strength | 35 | 19 | 6 | 4 | 5 | 20 |
|   | 10' gel strength | 82 | 29 | 14 | 5 | 14 | 36 |
|   |  |  |  |  |  | 16 h/185° C. |  |
| C | Fluid loss (ml) |  | 42 | 51 | 80 | >150 | >150 |
|   | App. visc. (cP) | 74 | 83 | 73 | 60 | 48 | 33 |
|   | YP (lb/100 ft 2) | 25 | 29 | 32 | 24 | 10 | 11 |

TABLE 2-continued

| Co-polymer | Aging/h Temp. (° C.) | before | 16 130 | 16 150 | 16 170 | 66 170 | 16 200 |
|---|---|---|---|---|---|---|---|
|  | 10" gel strength | 6 | 9 | 10 | 12 | 18 | 23 |
|  | 10' gel strength | 13 | 15 | 17 | 20 | 35 | 40 |

The test results show the superiority of the polymer A according to the invention over the polymers B and C representing the prior art to date, with regard to the uniform rheological properties of the drilling mud after mixing and after aging over the temperature range of 130–200° C. and with respect to the HTHP pressurized water loss.

If copolymers according to the invention are added to conventional deep-well cement slurries, products having considerably improved flow and setting properties and having lower water loss are obtained. The polymers according to the invention, prepared for example either according to Example 1 or Example 4 are added in amounts of 0.1–2.0% by weight, based on the cement used, to cement slurries of conventional composition which, based on, for example, "Class G" deep-well cement, contain, for example, 44% by weight of water, 0.1–2.0% by weight of a commercial dispersant for deep-well cement and, if required, retardants or accelerators and other additives. Depending on requirements, the cement slurry can, for example also be mixed with synthetic sea water or with NaCl solutions of different densities to saturation instead of with water.

The quality of the cement slurries thus prepared using the polymers according to the invention is assessed according to API spec 10. For example, with the polymers according to Examples 4 and 5, cement slurries having advantageously low plastic viscosity, low water loss and regulatable setting time and conformity with requirements in a temperature range of 60–200° C. are obtained. Table 3 below shows the advantageous properties of the copolymers 1 and 4 according to the invention over those of the prior art to date (Comparative Example 16).

TABLE 3

| Cement class |  | G | G | H |  |  |  |  |  |
|---|---|---|---|---|---|---|---|---|---|
| Slurry density | ppg | 15.4 | 16.2 | 15.8 |  |  |  |  |  |
|  | kg/l | 1.85 | 1.94 | 1.89 |  |  |  |  |  |
| Mixing water |  | Fresh water | 18% NaCl-water | Fresh water |  |  |  |  |  |
| PNS dispersant | % bwoc | 0.2 | 0.4 | 0.5 |  |  |  |  |  |
| HT retardant | % bwoc | 0 | 0 | 1.5 |  |  |  |  |  |
| Silica | % bwoc | 0 | 0 | 35 |  |  |  |  |  |
| Temperature | ° C. | 27 | 38 | 177 |  |  |  |  |  |
|  | ° F. | 80 | 100 | 350 |  |  |  |  |  |
| Example 1 (according to the invention) | % bwoc | 0.3 | 0.35 | 1.0 |  |  |  |  |  |
| Example 4 (according to the invention) | % bwoc |  | 0.3 |  | 0.35 |  | 1.0 |  |  |
| Example 16 (comparison) | % bwoc |  |  | 0.3 |  | 0.35 |  |  | 1.0 |
| Plastic viscosity | cP | 80 | 77 | 98 | 102 | 94 | 148 | 105* | 95* | 140* |
| Yield point | lb/100 ft² | 1.5 | 1.2 | 2.0 | 5 | 4.1 | 7.2 | 7.9* | 7.5* | 11* |
| Water loss | ml/30 min | 45 | 42 | 70 | 105 | 120 | 140 | 55 | 45 | 98 |

*Rheology measured at 93° C./200° F.
ppg: pounds per gallon;
bwoc: based on weight of cement The following investigations demonstrate the effectiveness of the water-soluble copolymer on the flow resistance of salt water and gas in a porous medium. The gas used is nitrogen, which serves as a substitute for natural gas. The porous media used are Vosges sandstone having a permeability K of 53 mD ($53 \cdot 10^{-15}$ m$^2$) and Oberkirchner sandstone having a permeability K of 5.4 mD ($5.4 \cdot 10^{-15}$ m$^2$). An aqueous solution having a salt content of 97.5 g of NaCl and 2.5 g of CaCl$_2$ per 100 g of water serves as "deposit water" and simultaneously as a solvent for the copolymers. Example 11 according to the invention and, for comparison, Example 15 representing the prior art to date are used as copolymers.

The investigations are divided into the following steps:

measurement of the nitrogen permeability of the water-free rock core $k_1$;

saturation of the porous medium with "deposit water" (=pore water); determination of the pressure gradient $$\frac{\Delta p_1}{l}$$

for the flow of water at constant rate $q_1$;

saturation of the porous medium with an aqueous copolymer solution;

displacement of the excess copolymer solution by "deposit water" until an equilibrium exists between the pore water and the adsorbing copolymer; measurement of the pressure gradient $$\frac{\Delta p_2}{l}$$

for water at flow rate $q_1$ in the presence of the adsorbed polymer;

displacement of the water with nitrogen and measurement of the nitrogen permeability in the presence of the adsorbed polymer $k_2$.

After these prepared operations which a person skilled in the art knows how to perform and therefore need not be explained in more detail, the residual flow resistance is determined for the "deposit water" and the nitrogen.

$$RRF_W = \frac{\Delta p_2}{\Delta p_1} \qquad RRF_G = \frac{k_1}{k_2}$$

The meanings are as follows:

k: permeability of the rock, depending on the pore size [Darcy] 1 $\mu$m$^2$=1 Darcy RRF: residual resistance factor $RRF_W$: residual resistance factor of the deposit water $RRF_G$: residual resistance factor of the gas (nitrogen)

l: length of the rock core [m]

p: pressure drop over the core [Pa]

q: flow rate of the water [m$^3$s$^{-1}$]

Figure 2:
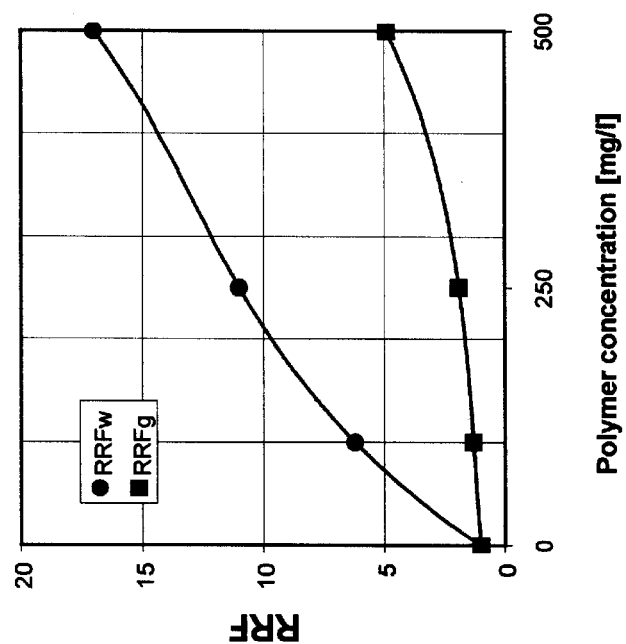

FIGS. 1 and 2 show the adsorption effect of the copolymer according to the invention from Example 11 and the resultant residual resistance factor for water and nitrogen in Vosges sandstone (FIG. 1) and Oberkirchner sandstone (FIG. 2). While the RRF for gas remains virtually constant up to a polymer concentration of 750 mg/l, that for water increases to 6 times the value (FIG. 1). FIG. 2 shows the result in Oberkirchner sandstone. In comparison with the Vosges sandstone, the critical polymer concentration decreases from 750 mg/l to 250 mg/l, which is due to the lower permeability of the sandstone.

FIGS. 3 and 4 show the results determined for Comparative Example 15 in Vosges and Oberkirchner sandstone. It is found that a higher polymer concentration is required to achieve the same adsorption effect.

In completion and clearing-out liquids, a water loss of 24 cm$^3$ is obtained with the polymer according to Example 9 in a salt solution having a density of 1.80 g/cm$^3$ and based on 19.2% by weight of CaBr$_2$ and 15.2% by weight of CaCl$_2$ in a test according to API Code 29 using an amount of 60 g/l at 20° C., and water losses of 10 and 11.5 cm$^3$ after aging for 17 hours at 100° C. and for 15 hours at 150° C., respectively.

What is claimed is:

1. A process for reducing water loss in a petroleum production slurry selected from the group consisting of borehole cement, drilling mud, and completion and clearing-out liquid, said process comprising adding to said slurry a copolymer comprising A) 5–95% by weight of structural units which are derived from compounds of the formula 1

$$H_2C=CH-C(=O)-HN-C(CH_3)_2-CH_2-SO_3^{\ominus}X^{\oplus} \qquad (1)$$

B) from 1 to 95% by weight of structural units which are derived from compounds of the formula 2

$$H_2C=CH-PO_3^{2-} \quad (2\,X^+) \qquad (2)$$

and

C1) from 1 to 95% by weight of structural units which are derived from compounds of the formula 3

$$H_2C=CH-CH_2-N^{\oplus}(CH_3)_2-CH_2-CH=CH_2 \quad Cl^- \qquad (3)$$

or, alternatively to C1),

C2) from 1 to 95% by weight of structural units which are derived from compounds of the formula 4

$$H_2C=CH-C(=O)-HN-(CH_2)_3-\overset{\oplus}{N}(CH_3)_3 \quad Cl^- \qquad (4)$$

in which X is a cation.

2. The process of claim 1, wherein the copolymer further comprises from 5 to 95% by weight of structural units derived from compounds of the formula (5)

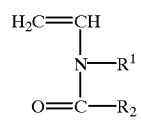
(5)
in which $R^1$ and $R^2$, independently of one another, are hydrogen, $C_1$–$C_4$-alkyl or —$(CH_2)$— and n is 3, 4 or 5, in the latter case $R^1$ and $R^2$ forming a ring.
3. The process of claim 1, wherein the copolymer comprises from 1 to 80% by weight of structural units which are derived from the group consisting of acrylamide, acrylic acid and mixtures thereof.
* * * * *